(12) United States Patent
English et al.

(10) Patent No.: US 9,544,080 B2
(45) Date of Patent: *Jan. 10, 2017

(54) SWITCHING ARCHITECTURE WITH PACKET ENCAPSULATION

(71) Applicant: GENBAND US LLC, Frisco, TX (US)

(72) Inventors: Daniel W. English, Salem, NH (US); John Doucette, Londonderry, NH (US); Paul Miller, Derry, NH (US); Hicham Saab, Derry, NH (US)

(73) Assignee: Genband US LLC, Plano, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/310,743

(22) Filed: Jun. 20, 2014

(65) Prior Publication Data

US 2014/0301398 A1 Oct. 9, 2014

Related U.S. Application Data

(63) Continuation of application No. 12/367,253, filed on Feb. 6, 2009, now Pat. No. 8,773,996, which is a
(Continued)

(51) Int. Cl.
*H04L 12/66* (2006.01)
*H04J 3/16* (2006.01)
(Continued)

(52) U.S. Cl.
CPC ............ *H04J 3/16* (2013.01); *H04L 12/6418* (2013.01); *H04M 7/0003* (2013.01);
(Continued)

(58) Field of Classification Search
USPC ......... 370/235, 352, 356, 392, 395.1, 395.3, 370/395.31, 395.51, 464, 353, 471
See application file for complete search history.

(56) References Cited

U.S. PATENT DOCUMENTS

| 4,603,416 A | 7/1986 | Servel et al. |
| 4,893,306 A * | 1/1990 | Chao ................ H04J 3/247 370/395.1 |

(Continued)

FOREIGN PATENT DOCUMENTS

| EP | 0312628 | 4/1989 |
| EP | 1 014 749 A2 | 6/2000 |

(Continued)

*Primary Examiner* — Kevin C Harper
*Assistant Examiner* — Mon Cheri Davenport
(74) *Attorney, Agent, or Firm* — Haynes and Boone, LLP

(57) ABSTRACT

The invention includes, among other things, a system for passing TDM traffic through a packet switch. In one embodiment, the system includes a packet switch that has a plurality of data ports and is capable of routing FSDU packets between the plurality of data ports. A TDM encapsulation circuit process a TDM data flow that is incoming to the switch. A circuit demultiplexer processes the incoming data flow to buffer data associated with different TDM circuits into different buffer locations. A timer monitors the amount of time available to fill the FSDU, and when the time period reaches the frame boundary, an FSDU generator generates an FSDU that is filled with data associated with the TDM circuits. Header information is added for allowing the packet switch to route the generated FSDU to a port associated with the respective TDM circuit.

20 Claims, 5 Drawing Sheets

Related U.S. Application Data continuation of application No. 10/430,200, filed on May 5, 2003, now Pat. No. 7,505,456.

(60) Provisional application No. 60/377,680, filed on May 3, 2002.

(51) Int. Cl.
 *H04L 12/64* (2006.01)
 *H04M 7/00* (2006.01)
 *H04M 7/12* (2006.01)

(52) U.S. Cl.
 CPC ....... *H04M 7/0075* (2013.01); *H04M 7/0078* (2013.01); *H04M 7/128* (2013.01); *H04M 7/1215* (2013.01); *H04L 2012/6459* (2013.01); *H04L 2012/6475* (2013.01); *H04L 2012/6489* (2013.01)

(56) References Cited

U.S. PATENT DOCUMENTS

| | | | |
|---|---|---|---|
| 4,962,497 A | 10/1990 | Ferenc et al. | |
| 5,278,828 A | 1/1994 | Chao | |
| 5,602,830 A | 2/1997 | Fichou et al. | |
| 5,889,773 A | 3/1999 | Stevenson, III | |
| 5,896,386 A | 4/1999 | Johnston | |
| 6,034,960 A * | 3/2000 | Beshai | H04L 12/5602 370/395.4 |
| 6,091,725 A | 7/2000 | Cheriton et al. | |
| 6,144,636 A | 11/2000 | Aimoto et al. | |
| 6,570,890 B1 | 5/2003 | Keenan et al. | |
| 6,574,217 B1 | 6/2003 | Lewis et al. | |
| 6,751,238 B1 | 6/2004 | Lipp et al. | |
| 6,931,002 B1 | 8/2005 | Simpkins et al. | |
| 6,959,008 B2 | 10/2005 | McClary et al. | |
| 6,987,813 B1 * | 1/2006 | Demetrescu | H04L 1/0065 375/295 |
| 7,035,289 B2 | 4/2006 | Devine et al. | |
| 7,369,491 B1 | 5/2008 | Beshai et al. | |
| 7,505,456 B2 * | 3/2009 | English | H04L 12/6418 370/356 |
| 7,817,543 B2 | 10/2010 | Beshai et al. | |
| 8,773,996 B2 * | 7/2014 | English | H04L 12/6418 370/235 |
| 2002/0037002 A1 | 3/2002 | Mizusawa et al. | |
| 2010/0008357 A1 | 1/2010 | English | |

FOREIGN PATENT DOCUMENTS

| | | |
|---|---|---|
| EP | 1 041 854 A2 | 10/2000 |
| EP | 1 170 975 | 1/2002 |
| EP | 1 202 599 | 5/2002 |
| JP | 05-199258 A | 8/1993 |
| JP | 05-227221 A | 9/1993 |
| WO | WO-0035154 | 6/2000 |
| WO | WO-0139467 A1 | 5/2001 |
| WO | WO-02 17036 | 2/2002 |

* cited by examiner

SWITCHING ARCHITECTURE WITH PACKET ENCAPSULATION

CROSS-REFERENCE TO RELATED APPLICATIONS

This application to is a continuation of Non-Provisional application Ser. No. 12/367,253, filed on Feb. 6, 2009, which is a continuation of Non-Provisional application Ser. No. 10/430,200, which claims priority to Provisional Application Ser. No. 60/377,680, filed on May 3, 2002, each of which is hereby incorporated herein by reference in its entirety.

BACKGROUND OF THE INVENTION

Cable television operators have typically been faced with telecommunications service solutions and architectures that were developed for other industries, classes of providers, scales, and physical plants. To date, two methods of providing voice services in the multimedia-rich cable industry have been proposed and are being tested: circuit switching and distributed telephony systems. Neither is well-suited to the need to carry a wide range of multimedia (video, audio, text, graphic, wideband, and narrowband) traffic over the limited geographic scale of the typical cable television outside plant, including but not limited to the types of hybrid fiber/coaxial cable (HFC) plants seen in the field today.

Circuit switching systems have been the standard switching means for primary voice quality and reliability in public telephony networks for many years. In such a system, circuit traffic is defined as having a pre-provisioned connection through a network. In particular, TDM-based circuit traffic is defined as having reserved bandwidth through the network, and more specifically, specific time slots through the network reserved to carry the traffic for that circuit whether or not any valid traffic is available to be sent. Certain standard TDM circuit formats have been defined such as DS0, DS1, and E1. Traditional methods for connecting TDM circuits together to complete a connection employ the use of a TDM-based switch. There are various architectures and ways to construct such a switch, but a general characteristic of such a switch is that once a connection is setup, there is no competition for switching resources, so a fixed latency through the switch is guaranteed.

In a distributed telephony system, such as that proposed by Cable Labs and others in the PacketCable™ initiative, telephony data is converted to packets and switched in a managed Internet Protocol (IP) environment, using a variety of IP and network protocols. The switch used in these types of systems, and for IP traffic in general, is typically referred to as a packet switch.

A packet switch is designed to handle packet traffic, which has different characteristics from circuit traffic. In particular, most packet systems are designed as connectionless, meaning they do not pre-provision a connection through the network, nor do they reserve bandwidth to carry the traffic. Some packet systems (for example, Asynchronous Transfer Mode [ATM] systems) do use connection-oriented protocols and some IP protocols (e.g., Multi-protocol Packet Label Switching [MPLS]) also provide a certain level of bandwidth reservation. However, these systems add extra complexity and potential compatibility issues.

In a packet switch, headers are attached to each individual packet to indicate the destination of the packet. The packets are switched in real-time to the correct output at each packet switch along the path. As a result, traffic arriving at a packet switch is non-deterministic and has to compete for switching resources as it tries to get through the switch. The resulting effect is that the packets are subject to a non-deterministic latency through the switch.

An additional characteristic of a packet switch is that it must be designed to handle different size packets. This is a result of the various protocols that are used in packet networks.

Typically, packets that are larger than the fixed size data unit (FSDU) are chopped into smaller pieces (i.e., fragmented or segmented). Packets that are smaller than the FSDU are padded to make a full FSDU. The size of the FSDU is arbitrary, although it is generally optimized to be efficient for the range of packet sizes expected in the application for which it is designed. An FSDU for a typical packet switch is between 64 bytes and 256 bytes.

As networks merge in the current telecommunication world, systems are being designed to accommodate both TDM circuit traffic and packet traffic simultaneously. Today the most common approach is to build a system that incorporates two separate switches, one that switches TDM data and one that switches packets.

This two switch approach arises from the above mentioned differences between circuit traffic and packet traffic. As discusses above, TDM-based circuit traffic has a reserved bandwidth through the network, and more specifically, specific time slots through the network reserved to carry the traffic for that circuit whether or not any valid traffic is available to be sent. There is no competition for switching resources, so a fixed latency through the switch is guaranteed. These switches can not handle packet traffic.

A packet switch does not pre-provision a connection through the network, nor do they reserve bandwidth to carry the traffic. Headers are attached to each individual packet to indicate the destination of the packet. The packets are switched in real-time to the correct output at each packet switch along the path. As a result, traffic arriving at a packet switch is non-deterministic and has to compete for switching resources as it tries to get through the switch. The resulting effect is that the packets are subject to a non-deterministic latency through the switch.

There remains a need in the art for an improved system that can switch both TDM traffic and packet traffic.

SUMMARY OF INVENTION

The invention includes, among other things, a system for passing TDM traffic through a packet switch. In one embodiment, the system includes a packet switch that has a plurality of data ports and is capable of routing FSDU packets between the plurality of data ports. A TDM encapsulation circuit processes a TDM data flow that is incoming to the switch. A circuit demultiplexer processes the incoming data flow to buffer data associated with different TDM circuits into different buffer locations. A timer monitors the amount of time available to fill the FSDU, and when the time period reaches the frame boundary, an FSDU generator generates an FSDU that is filled with data associated with the TDM circuits. Header information is added for allowing the packet switch to route the generated FSDU to a port associated with the respective TDM circuit.

In further embodiments, the may include a merge circuit for merging the generated FSDU with packet flow data being sent to the packet switch. Additionally, the system may include a decapsulation circuit for processing a generated FSDU passed through the packet switch to provide data to one or more TDM circuits sending data from a port of the packet switch.

The circuit demultiplexer may include a table access mechanism for accessing a connection table having information representative of the ports associated with a circuit.

In additional embodiments, the system may include a priority switch for associating a routing priority level with a generated FSDU, as well as a bandwidth allocation process for allocating bandwidth for generated FSDU traffic to provide a predetermined latency period for routing traffic through the packet switch.

In further optional embodiments, the system may further comprise a jitter buffer for reducing variable delays arising from passing through the packet switch. The jitter buffer may have a size selected as a function of a minimum and maximum latency for data passing through the packet switch, and for example may have a size selected to maintain jitter below 125 microseconds.

The packet switch may include ports capable of supporting a combination of traffic types, including packet type traffic and TDM type traffic.

Further optionally, the system may have a dropped-circuit detector for detecting a dropped TDM circuit. The FSDU generator responds to the dropped-circuit detector to adjust the contents of the FSDU.

In a further aspect, the invention will be understood to comprise a process for passing TDM traffic through a packet switch. The process may comprise the operations of providing a packet switch having a plurality of data ports and being capable of routing FSDU packets between the plurality of data ports; identifying a TDM data flow, encapsulating the TDM data flow by sorting the TDM data flow into different respective buffer locations, generating an FSDU that can pass through the packet switch and filling the generated FSDU with data associated with a respective one of the TDM circuits, generating header information representative of information for routing the generated FSDU to a port associated with the respective one of the TDM circuits, and combining the generated FSDU with a flow of packet data being sent to the packet switch.

Other objects and aspects of the invention will, in part, be obvious, and, in part, be shown from the following description of the systems and methods shown herein.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

To provide an overall understanding of the invention, certain illustrative embodiments will now be described. For example, in one embodiment the systems and methods described herein provide a media switching system that may couple to the headend of a cable system operator and exchange data between the headend and the PSTN. Thus, the systems described herein allow cable system operators having two-way connectivity to offer, inter olio, voice services. However, it will be understood by one of ordinary skill in the art that the systems and methods described herein can be adapted and modified for other suitable applications and that such other additions and modifications will not depart from the scope hereof.

Figure 1:
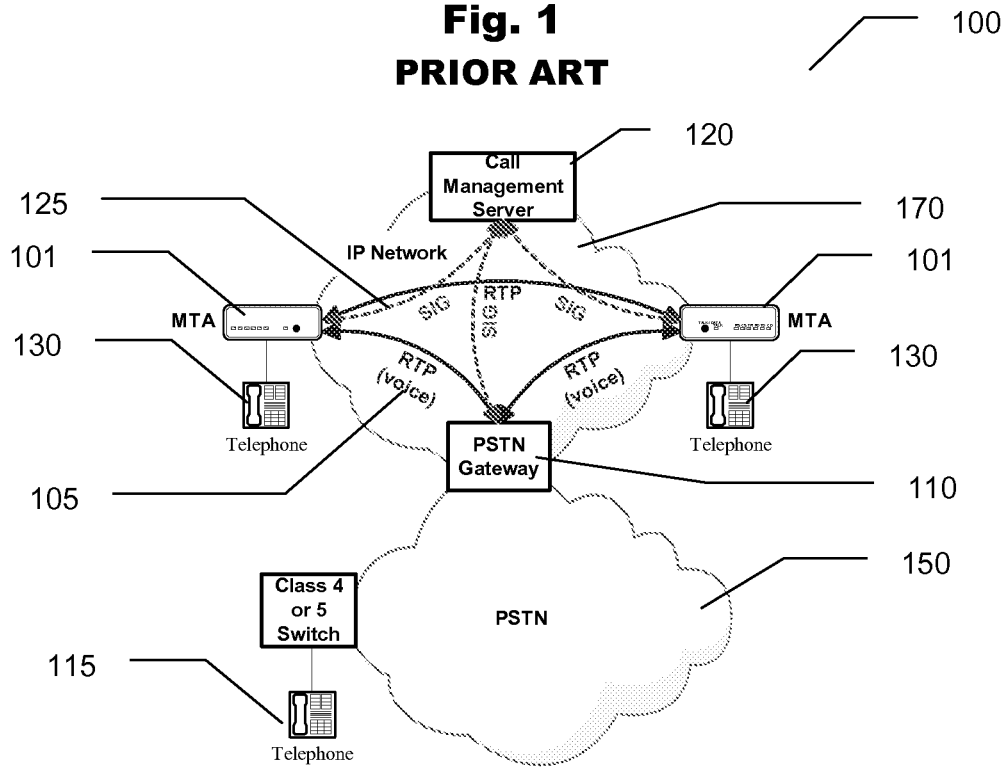
FIG. 1 is a high-level block diagram of a prior art VoIP softswitch architecture.

In prior art distributed telephony systems, such as the system 100 depicted in FIG. 1, a Call Management Server 120 responds to the media termination adapters (MTAs) 101 that will be involved in the call by providing to each MTA the other MTA's IP address. The depicted MTA 101 may be a PacketCable client device that contains a subscriber-side interface to the physical telephony equipment 130 (e.g., telephone), and a network-side signaling interface to call control elements in the network. An MTA typically provides the codecs, signaling and encapsulation functions required for media transport and call signaling. MTAs typically reside at the customer site and are connected to other network elements, such as for example via the Data Over Cable Service Interface Specification (DOCSIS) network. There are two common MTAs: standalone (S-MTA) and embedded (E-MTA), although any suitable MTA may be employed with the systems described herein. The IP network can thus route calls between MTAs based on traditional routing methods, path availability, cost, levels of congestion, number of hops, and others aspects of traffic and routing engineering. To this end, as shown in FIG. 1, the system 100 includes telephone systems 130 coupled to the MTAs 101. The MTAs exchange data across the IP Network 170, with signaling data 125 and voice data (RTP) 105 traveling across the network and between the Call Management Server (CMS) 120 and the PSTN gateway 110. The system 100 further depicts that coupled to the PSTN gateway is the PSTN network 150 with a class 4 or 5 switch for establishing circuit connections to the depicted telephony equipment 115.

In operation, a customer using the telephone 130 can use the MTA 101 to connect to the IP network 170 where the CMS 120 can support the delivery of a call across the PSTN gateway and onto the PSTN 150. Typically, the CMS provides call control and signaling-related services for the MTA, and PSTN gateways.

The approach provided by system 100, although effective for data communications, proves to be non-causal and non-deterministic for time-sensitive services like voice, where path latency, quality, privacy, and security need to be tightly controlled.

By contrast, the systems and methods described herein, provide paths that are deterministic, allowing for controlling the latency and the quality of the path to the switch. To this end, the systems and methods described herein provide, among other things, a single, highly integrated, secure, and reliable delivery point for multimedia services/data in a single network element with a single management system. By reducing the number of elements in the network, links are reduced, points of failure are reduced, and overall network reliability is increased. In addition, the level of integration provided by the described architecture allows for the efficient implementation of high-availability, fault-resilient methods of call-control, path restoration, and service delivery.

Figure 2:
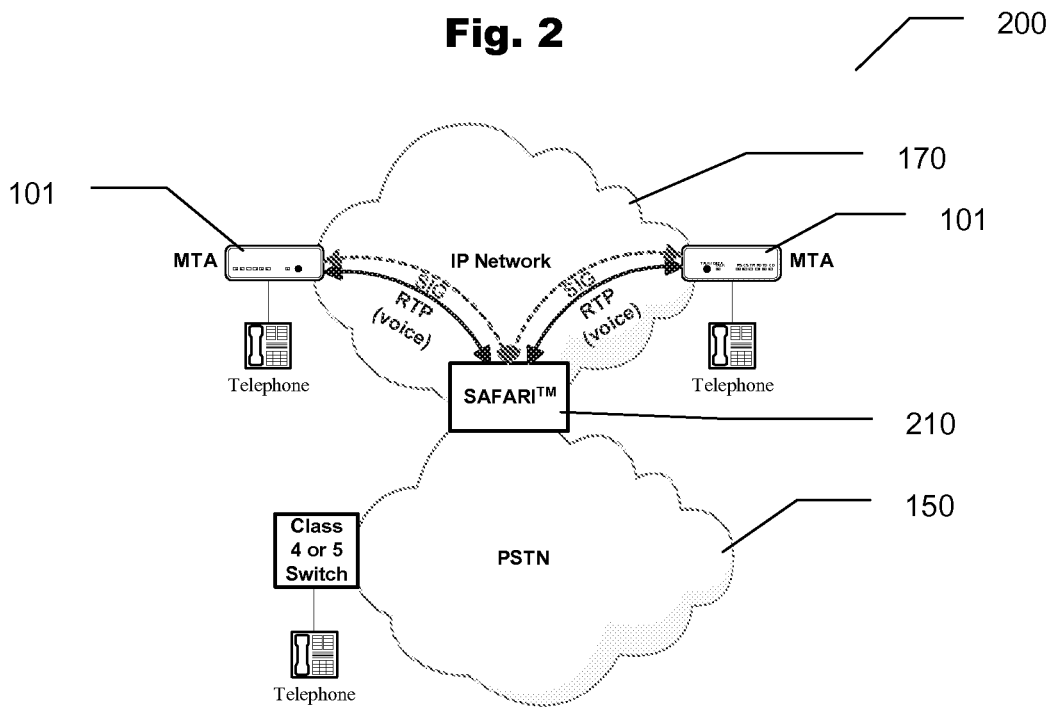
FIG. 2 is a high-level block diagram of the VoIP architecture according to one embodiment of the invention.

FIG. 2 illustrates one exemplary embodiment of a system 200 according to the invention. As shown in FIG. 2, the system 200 may comprise a plurality of MTAs 101, and a packet switch 210. The MTAs 101 and the packet switch 210 exchange information between themselves across the network 170. System 200 also includes a circuit switch, depicted as a class 4 or 5 switch 116 that allows circuits to be established across the PSTN 150 to support calls made with the one or more telephones 115. In one application the system 200 is situated at the headend of a cable system operator. The system 200 may interface with the cable modem termination system (CMTS) in a packet-based architecture, and/or replace a Class 5 switch as the device between the public switching telephone network and the host digital terminal in a circuit environment, thereby offering a migration path from circuit switched telephony to packet switched telephony. As will be described in more detail below, the system 200 may, in certain embodiments, enable packet-to-packet, packet-to-circuit, circuit-to-packet and circuit-to-circuit calls over the same packet based switch fabric.

Accordingly, the system 200 is depicts a system for supporting communication across an IP network and the PSTN. However, this architecture was chosen merely for the purpose of clarity in illustration and the systems and methods described herein are not so limited. For example, although FIG. 2 depicts the PSTN network 150, the systems and methods described herein may be employed to support architectures that incorporate other types of switching networks. Thus, the systems and methods may be employed with any circuit-switched network that provides a network in which a physical path is obtained for and typically dedicated, or substantially dedicated, to a single connection between two or more end-points in the network for the duration of the connection. Moreover, although FIG. 2 depicts an IP network 170, the systems and methods described herein are not so limited and may be employed with other packet-switched networks. Thus, the system 200 may be employed with other types of packet networks in which small units of data (packets) are routed through a network based on the destination address contained within a packet. This type of communication is typically described as connectionless, rather than dedicated like the circuit-switched network.

In the depicted system 200, MTAs 101 are provided the IP address of the switch 210 and the IP addresses of all other MTAs are kept private. By instructing the MTAs 101 to route all Real Time Protocol (as described by Internet Engineering Task Force RFC 1889) (RTP) data units (or streams) to the switch 210, Quality of Service (QoS) provisioning is simplified.

Figure 3:
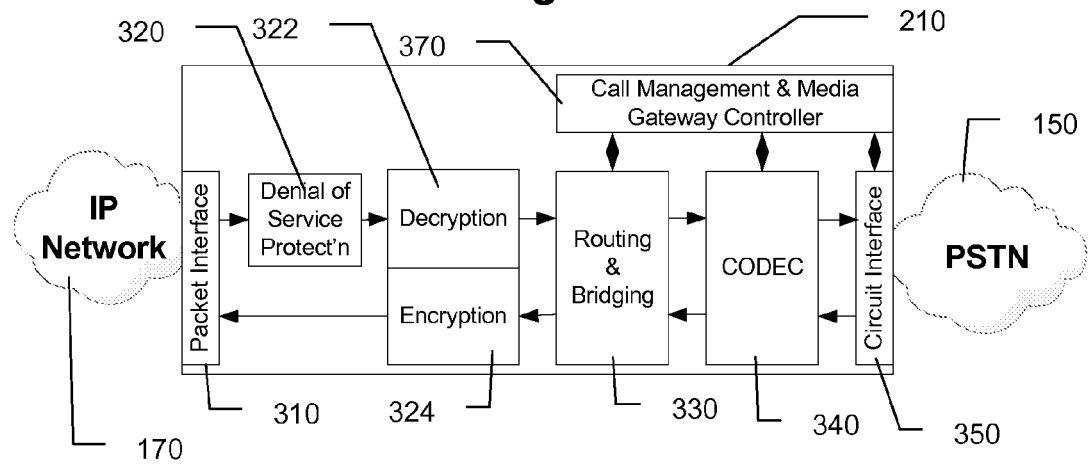
FIG. 3 is a functional block diagram according to one embodiment of the invention.

The switch 210 includes interfaces to the IP 170 and PSTN Networks 150, optional Denial of Service (DoS) attack protection, optional encryption and decryption unit, routing and bridging, and TDM Coding/Decoding (CODEC) functions, as shown in FIG. 3.

RTP data units, conventionally referred to as "packets," originating from any MTA 101 in the IP network 170 are first received at an ingress port (not shown), processed by the Packet Interface 310, and sent, in one embodiment, to the Denial of Service Protection block 320. The DoS protection block 320 keeps Denial of Service attacks from reaching and degrading subsequent packet processing. Packets are then decrypted to meet the security requirements of the IP network 170 and sent to the Routing & Bridging block 330.

Note that the "processing" referred to above includes reformatting the RTP data unit streams into encapsulated packet streams for use internal to the switch 210. These encapsulated packets (discussed further below) provide for efficient transport and receipt at the egress ports.

The Routing & Bridging block 330 applies the appropriate routing and/or bridging function based on the destination and services specified for the call to determine which egress port to send the data units out on. Packets can be rerouted (directed) back to the IP network 170, in which case they will be encrypted 324 and processed by the Packet Interface 310, or sent to the CODEC block 340.

The CODEC block performs standard coding and decoding functions such as those described in ITU Specifications G.711, G.729, G.168, and/or N-way bridging.

The depicted Circuit Interface 350 provides a standard DS0 circuit interface to the PSTN; likewise, the Call Management and Media Gateway Controller 370 performs typical functions defined for VoIP telephony and currently practiced in the art. Arranging these functions as illustrated protects IP network users and services from malicious attack and provides a unique solution for providing carrier grade telephony and CALEA monitoring services in a VoIP network.

In one embodiment, internal communications and switching functions within the switch are implemented using direct fiber optic connections through a fiber optic backplane equipped with Cedar Point Inc.'s removable optical backplane connectors. The removable backplane connector is further described in U.S. patent application Ser. No. 09/938, 228, filed on Aug. 23, 2001, incorporated herein by reference in its entirety.

The depicted system 200 utilizes a low-latency, low-overhead, bandwidth-efficient method for DS0 circuit encapsulation designed to carry circuit traffic as efficiently as packet traffic. This DS0 circuit encapsulation method may be configured to accommodate mix of data units, packets, and VoIP traffic. In particular, it provides a method for encapsulating circuit traffic for low-overhead packet data unit switching through a fabric so that the specific delay requirements of voice and other latency-intolerant circuit traffic are met. Although the system 200 is described with reference to DS0 traffic, it is not so limited and may be applied to other types and formats of traffic traveling across the circuit-switched network. In such applications, the information being transmitted across or otherwise associated with a circuit will be identified and encapsulated for transmission through the switch 210.

Figure 4A:
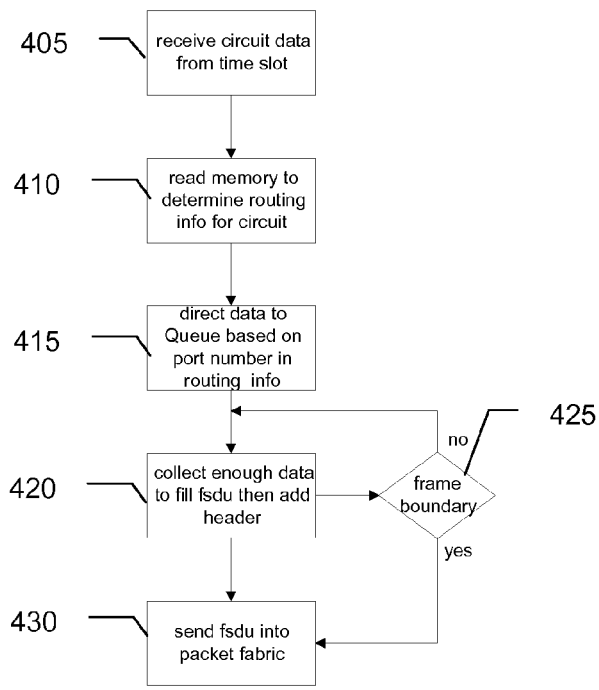
FIGS. 4A-C are flowchart depictions of the packet encapsulation process according to one embodiment of the invention.

One exemplary encapsulation process is illustrated in FIG. 4A. Here, the Ingress flow (whose processing is shown in FIG. 4A) is a data stream coming into the switch from the circuit network, i.e., the PSTN. The Egress flow (shown in FIG. 4A) is the data stream leaving the switch and entering the PSTN in a TDM time slot.

For an ingress flow, shown in FIG. 4A, processing begins when the circuit data unit is received (read) during the selected TDM time slot, step 405. The process then checks memory to determine the routing information corresponding to the received data unit, step 410. The data unit is directed to a particular queue based on the egress port number derived, at least in part, from the routing information, step 415. In one embodiment, the memory stores a connection table. In a circuit-switch system a connection may be established between two ends of a circuit by provisioning one end of the circuit. The connection may be within the same system or between physically separate systems. In either case, the system is to have a transmission media with available bandwidth to send control cells that are carried in-band and that contain the information that the remote end of the circuit employs to provision that circuit. The systems and methods described herein may be employed for switching/routing control information as well as data being communicated by the parties.

In one embodiment, a circuit connection table is kept at both ends of the circuit. This table contains the new and existing circuit connection information. The circuit that is to be established may be constant bit rate (CBR) or variable bit rate (VBR). A software process writes to the connection table at the local end of the circuit with the address information of the remote end of the circuit. The circuit connection information may be periodically sent to the remote end(s) to establish or tear down new connections. The frequency of these updates may be determined by the requirement of the application and the amount of bandwidth that one is willing to forfeit. In applications where a live person is waiting for the connection to be established, an update frequency of 5-50 times a second is sufficiently fast. Because this mechanism may be embedded in hardware, it can be very fast and introduces little to no overhead on the system processor. In either case, the connection table stores information that may be employed by the switch 210 for maintaining routing information for the circuits being handled.

In one embodiment, the incoming TDM data is sorted and data associated with one circuit is stored in one of a plurality of FIFOs and data associated with a second separate destination is stored in a different respective FIFO. In this way, each FIFO act as a memory buffer that stores incoming data for a particular destination. This process is graphically depicted in FIG. 4C which shows the incoming TDM data being sorted and stored into separate storage devices based on the destination associated with each incoming packet of TDM data. To this end, the switch may include a circuit demultiplexer that processes the incoming data flow to buffer data associated with different TDM circuits into different buffer locations. Once the incoming TDM data is sorted into separate storage devices, the system may read data from the storage devices in a predictable and controlled manner. On the other end, the switch may include a circuit demultiplexer that has a table access process for accessing the connection table and for providing data to one or more of the TDM circuits at the output port.

Step 420 continues the process of steps 405 through 415 until enough data units are collected to fill a generated FSDU by testing for a frame boundary, 425, after each addition to the queue. Once the FSDU is filled, a header is added to the FSDU, creating the encapsulated packet. The encapsulated data packet is then sent into the switch fabric and directed to the proper egress queue, in step 430. The process repeats at step 405 as long as there is data present at the ingress port.

Figure 4B:
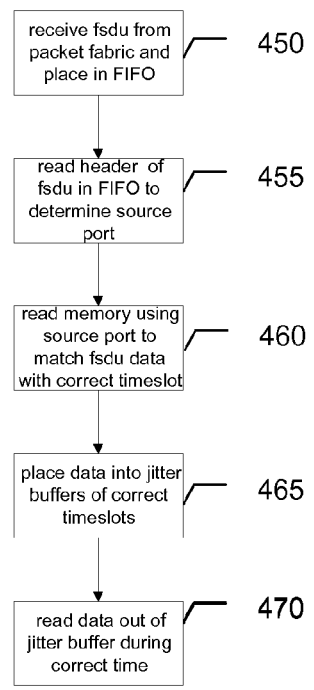
Figure 4C:
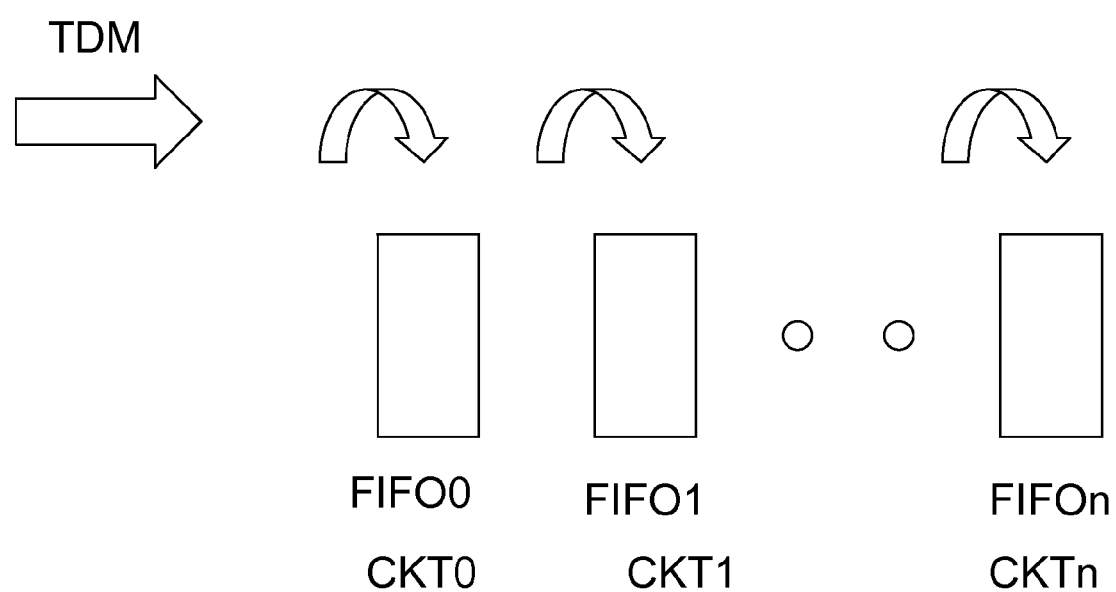

The egress flow process, depicted in one embodiment, in FIG. 4B, is similar. In step 450, the encapsulated data packet is received from the switching fabric and placed in a FIFO buffer. The header is read, step 455, and the source port is determined from the information stored in the header. The source port identifier is used to read the memory location corresponding to this FSDU to determine the correct timeslot for each data unit in the FSDU in step 460. The data units in the FSDU are then unpacked (i.e., re-formatted) and placed into jitter buffers corresponding to the destination timeslot for each data unit, step 465.

When the correct timeslot time arrives, the data units are read out of each jitter buffer and transmitted into the TDM stream.

The switching system processes described above with reference to FIGS. 4A and 4B may be realized as a one or more software processes operating on data processing platform. In that embodiment, the processes may be implemented as a C language computer program, or a computer program written in any high level language including C++, Fortran, Java or BASIC. Additionally, in applications where the processes is code running on an embedded system, the computer programs may be written, in part or in whole, in microcode or written in a high level language and compiled down to microcode that can be executed on the platform employed. The development of programs is known to those of skill in the art, and such techniques are set forth in, for example, Stephen G. Kochan, Programming in C, Hayden Publishing (1983).

The depicted exemplary embodiment is used to switch both packet traffic and TDM-based DS0 traffic simultaneously using the same fabric. A packet switch (by definition) is designed to handle the specific requirements of packet traffic, and the system 200 may provide conventional packet switching functionality as described elsewhere in this disclosure.

Figure 5:
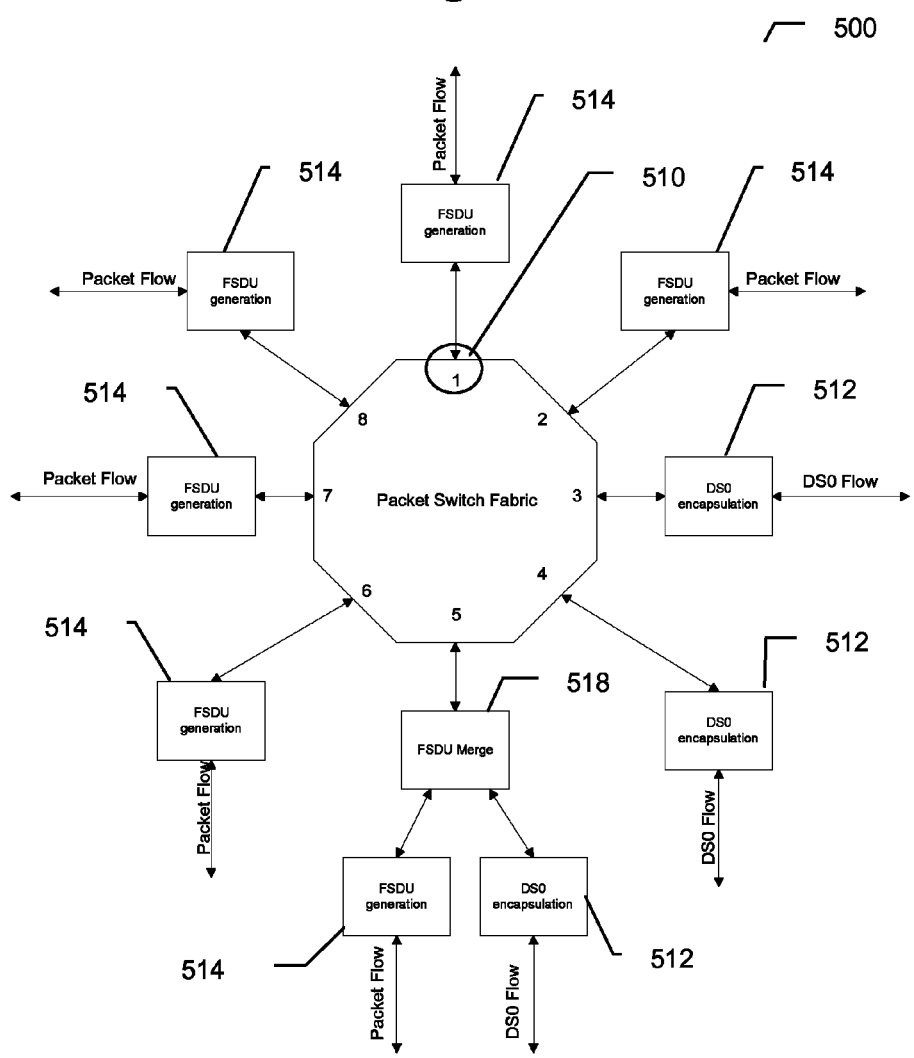
FIG. 5 is a high-level block diagram of a switch fabric architecture of an exemplary embodiment of the invention.

Turning to FIG. 5, one embodiment of a system 500 according to the invention is depicted. Specifically, FIG. 5 illustrates a packet switch fabric 500 capable of passing TDM traffic. As show, the packet switch fabric 500 has a plurality of data ports, 1, 2, . . . 8. The switch is capable of routing FSDU packets between these data ports. As described in more detail below, in the depicted embodiment, several of the ingress ports, 3, 4, and 5, are managing both incoming and outgoing flows of TDM data. Port 5 is capable of supporting a combination of traffic types. The switch 500 includes several TDM encapsulation circuits 512 that process a respective TDM data flow. The circuit demultiplexer processes the incoming data flow to buffer data associated with different TDM circuits into different buffer locations, as shown I FIG. 4C. An internal timer process monitors the amount of time available to fill the FSDU, and when the time period reaches the frame boundary, the depicted FSDU generators 514 create an FSDU that is filled with data associated with the TDM circuits. The FSDU generators 514 create header information that is added for allowing the packet switch 500 to route the generated FSDU to a port associated with the respective TDM circuit.

FIG. 5 further depicts that certain ports handle both type of traffic. A FSDU merge circuit 518 communicates with the FSDU generators 514 and the encapsulation circuits 512 to merge the generated packet flow for delivery to and from port 5.

As the ports 1, 2, . . . 8 are depicted as bi-directional, the switch 500 may include a decapsulation circuit for processing a generated FSDU that has been passed through the packet switch. The decapsulation circuit provides data to one or more TDM circuits that are sending data from a port 1, 2, . . . 8 of the packet switch 500.

A packet switch fabric 500 has a finite number of high-speed ports 510 (eight, for example), as shown in FIG. 5, although any number can be used in practice. This implies that there may be eight ingress (input) ports and eight egress (output) ports to the switch fabric. In each cycle time, the eight inputs may be connected in some fashion to the eight outputs to create up to eight connections. During this cycle time, one FSDU may be passed on each connection. Depending on traffic behavior, not every input may be able to connect to the output required for the FSDU it has to send (i.e., contention may arise). In this situation, it may take several cycle times for all eight inputs to send one FSDU. If all inputs wish to send their FSDU to the same output, it will take eight cycle times for all the FSDUs to be sent.

Switch traffic may consist of any arbitrary mix of packet traffic and DS0 traffic on the different ports. Some ports may be dedicated to packet traffic (e.g., port 511 in FIG. 5), some ports may be dedicated to DS0 traffic (e.g., port 513), and some ports may support a combination of traffic types (e.g., port 515). The depicted switch 500 allows for any combination of traffic types without affecting the performance characteristics required by the applications. Furthermore, the switch 500 is transparent to the actual information represented by the packet or TDM (DS0) data flows. Voice signals, data, FAX or modem signals, video, graphics, or any other information can be carried and switched with equal ease and facility by and within the systems described herein.

Typically, a DS0 TDM circuit carries a single byte of data every 125 usec. This time interval is more commonly referred to as a frame in the telecommunications arts. Since the packet fabric has an FSDU of between 64 bytes and 256 bytes, a single DS0 TDM circuit does not come close to filling an FSDU. The remaining space in the FSDU would be wasted by filling it with padding if an individual DS0 circuit was dedicated to a single FSDU. Thus, it would be very inefficient to map a single byte of data into such a large FSDU.

One option is to wait a longer period of time in order to accumulate a larger number of bytes for the DS0 circuit. In order to fill a 64 byte FSDU, one would have to wait 8 msec, or 32 msec for a 256 byte FSDU. With voice calls, this represents a significant delay for the circuit and does not meet typical "toll" Quality of Service network switching requirements. It also requires a much larger amount of memory to handle the temporary storage of this data. Neither one of these options is ideal.

Figure 6:
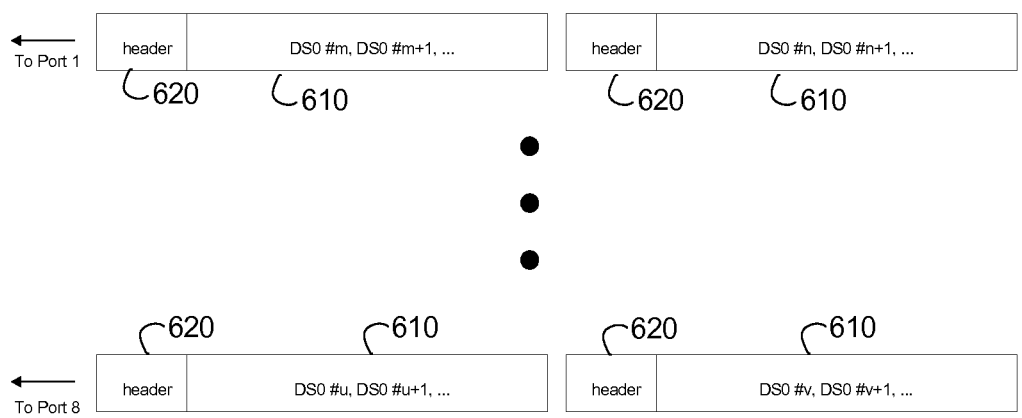
FIG. 6 is a schematic representation of the TDM data format employed in some embodiments of the invention.

According to some embodiments of the present invention, multiple DS0 TDM circuits are combined within each frame time to more completely fill an FSDU 610. This combination is illustrated in FIG. 6. Since there is a fixed and manageable number of switch fabric ports, it is reasonable to fill FSDUs 610 with multiple DS0 circuits destined for the same switch fabric output port.

This a dynamic process: as DS0 circuits destined for a particular switch fabric come and go, the process dynamically adds and drops DS0 circuits to efficiently fill the FSDU 610 destined for each port. To this end, the packet switch 500 may include a dropped-circuit detector that determines if a circuit is dropped. In one embodiment, the dropped circuit detector is a table that monitors the number of circuits in the data flow of TDM data. If a circuit is dropped, all circuits that are still active will slide to fill in the hole left by the dropped circuit. The dropped circuit detector may be a hardware device, a software process or any combination thereof.

For each of the switch fabric ports receiving packet flow data, a separate circuit 520 (referring to FIG. 5) is used to generate FSDUs for traffic headed for that port. A header 620 at the beginning of each FSDU identifies the switch fabric port along with priority information to guide the FSDU properly through the switch fabric. The rest of the FSDU is filled with TDM data. For example, if a 64 byte FSDU contains 2 bytes of overhead, the remainder of the FSDU can be filled with 62 DS0 TDM channels. Within each frame, as a single byte of data from each circuit is received on the device, it is added to the FSDU for the particular destination port to which it should be sent. When an FSDU is full, it is sent to the packet switch and another FSDU is started for that port. In typical embodiments, all FSDUs are sent by the end of the frame, even if they are not completely filled, in order to keep the delay of the method to 125 usec. Using this scheme, the data is filled in the FSDUs with 62/64 or 96.9% efficiency per FSDU except for at most 16 FSDUs that may be only partially filled. With a 256 byte FSDU, this efficiency rises to 254/256 or 99.2% per FSDU. If the switch can handle 16,000 circuits, the 64 byte FSDU has an overall efficiency of 91.2% and the 256 byte FSDU has an overall efficiency of 93.4%. In comparison, putting a single DS0 TDM channel into an FSDU has an efficiency of only 1.6%.

On the output (egress) side of the switch fabric, the FSDUs are processed (reformatted) to remove the headers and pull out the individual DS0 channels. The routing information for each channel can be made available to the processing device at the output of the switch fabric through different methods that are well-known in the switching and routing arts. The DS0s are then put back into a TDM format again for transmission through the egress ports and into the network.

In conjunction with the method for packing the FSDUs as described above, since the DS0 data is very time sensitive, it must be passed through the switch fabric with a guaranteed maximum latency. As mentioned above, the switch fabric is shared with packet traffic that can exhibit bursty arrival behavior. To prevent packet traffic from competing with the high priority TDM traffic, the TDM-based FSDUs are assigned a priority level that is higher than that of the packet traffic. Provided the bandwidth allocated for the particular priority level assigned to TDM traffic is not exceeded, the amount of TDM traffic is deterministic, and the latency for TDM traffic through the switch fabric can be guaranteed independent of the quantity of packet traffic. To this end, the switch 500 may include a priority circuit for associating a routing priority level with a generated FSDU. In one embodiment, the circuit adds priority data to the header information of the respective FSDUs. Additionally, the switch 500 may include a bandwidth allocation process for allocating bandwidth for the generated FSDU traffic. The bandwidth allocation process may be a software process that provides a predetermined latency period for routing traffic through the packet switch.

The effect of this method is such that the circuit and packet traffic can be mixed in any combination through the switch fabric with neither type of traffic impacting the performance of the other.

Since the latency can be bounded, it is now possible to reconstruct the TDM stream on the output side of the switch fabric and align the individual data streams into the correct time slot assignment. In order to accomplish this, a jitter buffer is necessary to smooth out the variable delays encountered by going through the packet switch. Since low latency is important, it is necessary to size the jitter buffer as small as possible; however, the jitter buffer must be sized large enough to account for the minimum and maximum latencies through the switching fabric. Using commercially available packet switch fabrics, it is reasonable to constrain the jitter buffer to introduce an additional delay of no more than a single frame time of 125 microseconds.

This system architecture's switch fabric implementation thus produces a single switch fabric with the latency and throughput performance equivalent to having separate dedicated TDM and packet switches. It accomplishes this without the expense of multiple fabrics or the complexity of interconnecting them.

Alternate Embodiments

Although the systems and methods described have been directed to systems that exchange information, whether voice, data, fax, video, audio or multimedia, over the PSTN network 150, the systems and methods described herein are not so limited. The systems and methods describe herein may be employed to support architectures that incorporate other types of switching networks. Thus, the systems and methods may be employed with other circuit-switched networks that provide a network in which a physical path is obtained for and typically dedicated, or substantially dedicated, to a single connection between two or more endpoints in the network for the duration of the connection. Moreover, although FIG. 2 depicts an IP network 170, the systems and methods described herein are not so limited and may be employed with other packet-switched networks. Thus, the system 200 may be employed with other types of packet networks in which small units of data (packets) are routed through a network based on the destination address contained within a packet. This type of communication is typically described as connectionless, rather than dedicated like the circuit-switched network.

Thus, the systems described herein may be employed to support VoIP (Internet Protocol), a connectionless protocol that typically is understood to allow traffic (packets) to be routed along paths with the least congestion. Additionally and alternatively, the systems and methods described herein may be employed to support VoDSL (Digital Subscriber Line). As is generally known, DSL is employed by phone companies to provide data and communications services on their existing infrastructure. VoDSL can be delivered over ATM, frame relay or IP. In such applications, the systems will typically include DSL modems (or Integrated Access Devices—IAD) in the consumer's home to interface between the DSL network service and the customer's voice/data equipment, and a voice gateway, which receives the voice traffic from the data network, depacketizes it and sends it to a Class-5 switch on the PSTN 150. The switch provides dial tone, call routing and other services for the circuit-switched network. In a further alternate embodiment, the systems and methods described herein may be used in VoFR (Frame Relay) applications. Such technology is used in corporate networks. Thus, in these applications, the systems and methods described herein may be employed for exchanging data across an LAN. Further, other applications include VoATM (Asynchronous Transfer Mode). As is generally known in the art, ATM is a high-speed scalable technology that supports voice, data and video simultaneously. It uses short, fixed-length packets called cells for transport. Information is divided within the cells, transported and then re-assembled at their destination. ATM allows providers to guarantee QoS. Many carriers use ATM in the core of their networks. It is also chosen by large corporations to connect locations over a WAN. ATM employs out-of-band signaling which enables it to establish call paths for the voice samples using signaling-only circuits that handle signaling for a large number of calls. The systems of the invention may be modified to support ATM networks and in some embodiments may support out-of-band signaling.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the invention may comprise computer instructions in any form (e.g., source code, object code, microcode, interpreted code, etc.) stored in any computer-readable medium (e.g., ROM, RAM, flash memory, magnetic media, punched tape or card, compact disc (CD) in any form, DVD, etc.). Furthermore, for purposes of clarity in illustration, the systems and methods described discuss telephony applications. However, the systems and methods described herein are not limited and may be employed in other applications including other uses of data packet technologies, including a range of multimedia services, multimedia conferencing, interactive gaming, video on demand, distance learning and general multimedia applications. Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

What is claimed is:

1. A system for passing Time Division Multiplexing (TDM) traffic through a packet switch, comprising:
   a packet switch having a plurality of data ports and being capable of routing Fixed Size Data Unit (FSDU) packets between the plurality of data ports;
   a TDM encapsulation circuit coupled to a data flow of TDM data and having a circuit demultiplexer for processing an incoming data flow of TDM data to buffer data associated with different TDM circuits into different buffer locations, a timer for monitoring a frame boundary,
   a FSDU generator for generating an FSDU and filling the generated FSDU with data associated with a respective one of the TDM circuits and for generating header information representative of information for allowing the packet switch to route the generated FSDU to a port associated with the respective one of the TDM circuits; and
   a jitter buffer for reducing variable delays arising from passing through the packet switch, wherein the jitter buffer has a size selected to maintain jitter below 125 microseconds.

2. A system according to claim 1, further comprising:
   a merge circuit for merging the generated FSDU with packet flow data being sent to the packet switch.

3. A system according to claim 1, further comprising:
   a decapsulation circuit for processing a generated FSDU passed through the packet switch to provide data to one or more TDM circuits sending data from a port of the packet switch.

4. A system according to claim 1, wherein the circuit demultiplexer includes means for accessing a connection table having information representative of the ports associated with a circuit.

5. A system according to claim 1, further including a priority switch for associating a routing priority level with a generated FSDU.

6. A system according to claim 5, further comprising a bandwidth allocation process for allocating bandwidth for generated FSDU traffic to provide a predetermined latency period for routing traffic through the packet switch.

7. A system according to claim 1, wherein the jitter buffer has a size selected as a function of a minimum and maximum latency for data passing through the packet switch.

8. A system according to claim 1, wherein the packet switch includes ports capable of supporting a combination of traffic types.

9. A system according to claim 1, wherein traffic types include packet type traffic and TDM type traffic.

10. A system according to claim 1, further comprising a dropped-circuit detector for detecting a dropped TDM circuit.

11. A system according to claim 10, wherein the FSDU generator responds to the dropped circuit detector to adjust the contents of the FSDU.

12. A process for passing Time Division Multiplexing (TDM) traffic through a packet switch having a plurality of data ports and being capable of routing Fixed Size Data Unit (FSDU) packets between the plurality of data ports, the process comprising;
    encapsulating a TDM data flow by sorting the TDM data flow into different respective buffer locations;
    generating an FSDU that can pass through the packet switch and filling the generated FSDU with data associated with a respective one of the TDM circuits;
    generating header information representative of information for routing the generated FSDU to a port associated with the respective one of the TDM circuits;
    combining the generated FSDU with a flow of packet data being sent to the packet switch; and
    with a jitter buffer, reducing variable delays arising from passing through the packet switch, wherein the jitter buffer has a size selected to maintain jitter below 125 microseconds.

13. A process according to claim 12, further comprising processing a generated FSDU having been passed through the packet switch to reconstruct a TDM data flow circuit at an output port of the packet switch.

14. A process according to claim 13, further comprising monitoring the number of TDM circuits within the TDM data flow to identify a change in the number of TDM circuits.

15. A process according to claim 14, further comprising altering the contents of the generated FSDU as a function of a detected change in the number of circuits in the TDM data flow.

16. A process according to claim 12, further comprising setting a timer to establish a time period for filling the generated FSDU.

17. A process according to claim 16, wherein the time period is set to the TDM frame boundary period.

18. A process according to claim 12, further comprising buffering a generated TDM circuit at an output port to reduce latency induced time variations.

19. The system of claim 1, further comprising, a timer to establish a time period for filling the generated FSDU, wherein the time period is set to a TDM frame boundary period.

20. A process for passing Time Division Multiplexing (TDM) traffic through a packet switch having a plurality of data ports and being capable of routing Fixed Size Data Unit (FSDU) packets between the plurality of data ports, the process comprising;
    encapsulating a TDM data flow by sorting the TDM data flow into different respective buffer locations;
    generating an FSDU that can pass through the packet switch and filling the generated FSDU with data associated with a respective one of the TDM circuits;
    generating header information representative of information for routing the generated FSDU to a port associated with the respective one of the TDM circuits;
    combining the generated FSDU with a flow of packet data being sent to the packet switch; and
    setting a timer to establish a time period for filling the generated FSDU, wherein the time period is set to a TDM frame boundary period.

* * * * *